INVENTOR.
STANFORD OVSHINSKY
BY
William Soler
ATTORNEY

Dec. 21, 1954
S. OVSHINSKY
2,697,610
RADIALLY RECIPROCATING JAW CHUCK WITH FLUID PRESSURE ACTUATOR
Filed Oct. 4, 1948
4 Sheets-Sheet 4
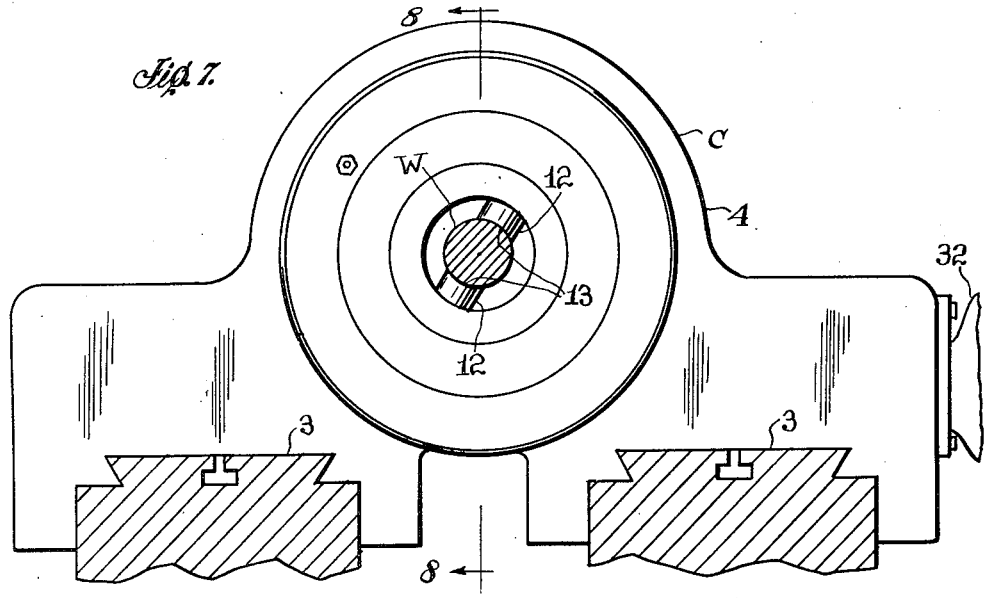
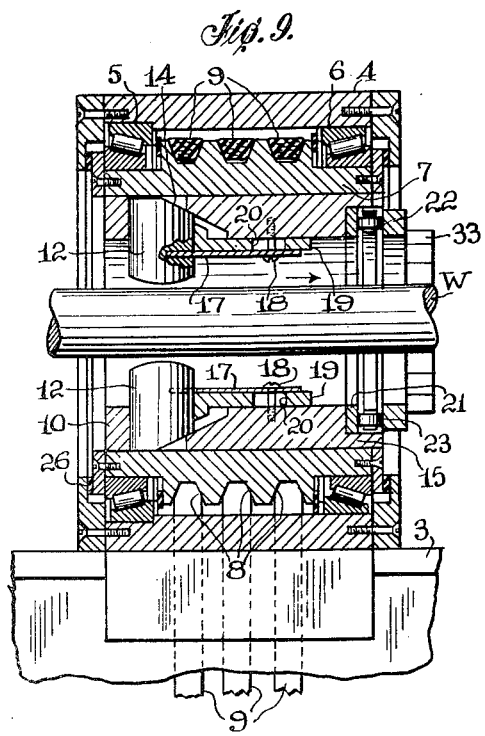
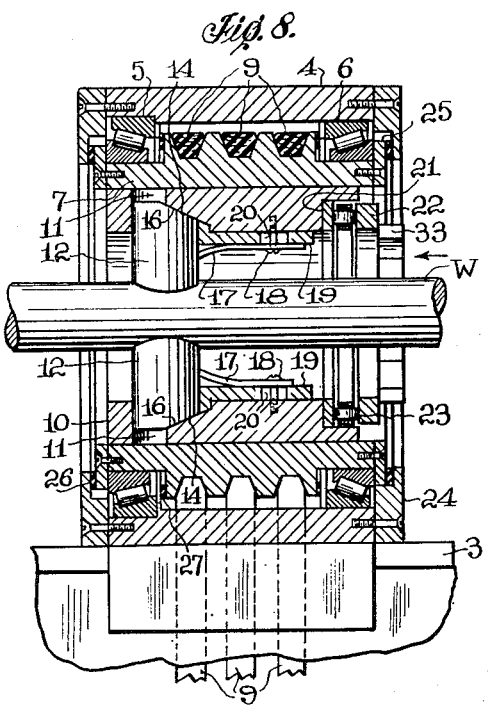
INVENTOR.
STANFORD OVSHINSKY
BY
William Isler
ATTORNEY

United States Patent Office 2,697,610
Patented Dec. 21, 1954

2,697,610

RADIALLY RECIPROCATING JAW CHUCK WITH FLUID PRESSURE ACTUATOR

Stanford Ovshinsky, Dover, Ohio, assignor to The Stanford Roberts Manufacturing Company, Akron, Ohio, a corporation of Ohio Application October 4, 1948, Serial No. 52,719

12 Claims. (Cl. 279—4)

This invention relates, as indicated, to machine tools, but has reference more particularly to a machine tool of the center-drive lathe type.

A primary object of the invention is to provide a machine tool of the character described, which is of such massiveness, rigidity and general construction that work can be machined therein at extremely high speeds with carbide tools and the like without chattering or vibration of the work or tools.

Another object of the invention is to provide a machine tool of the character described, having a center drive of unique and novel construction enabling workpieces clamped therein to be machined at both ends simultaneously, the machine operations at each end being accomplished without affecting the machining operations at the other end.

Another object of the invention is to provide a machine tool of the character described in which stresses imposed upon the machine tool even at maximum speeds of the center drive are easily and completely absorbed.

A further object of the invention is to provide a machine tool of the character described, in which there is a total absence of "leverage" or "wiggle" which is characteristic of so-called single end machines, so that work machined therein is devoid of deep feed marks and other defects common in the machining of shafts and the like.

A further object of the invention is to provide a machine tool of the character described, in which no slippage of the workpiece in the center drive can occur, even at speeds and feeds which were heretofore considered unattainable.

A further object of the invention is to provide a machine tool of the character described, in which the chucking operation is completely automatic and is effected through air, hydraulic or mechanical pressure.

A further object of the invention is to provide a machine tool of the character described, in which the center drive is of such construction that substantially the entire workpiece, including the major portion thereof within the center drive, is accessible for machining operations.

A still further object of the invention is to provide a machine tool of the character described, having novel tool feed means incorporated therein, as well as novel means for effecting auxiliary machining operations.

Other objects and advantages of the invention will be apparent during the course of the following description.

In the accompanying drawings, forming a part of this specification, and in which like numerals are employed to designate like parts throughout the same, Fig. 1 is a perspective view of a machine tool embodying the invention;

Fig. 5 is a fragmentary top plan view, on an enlarged scale, showing the use of the overhead bar;

Fig. 6 is a fragmentary side elevational view of the yoke lever for actuating the chuck jaws;

Fig. 7 is a side elevational view of the chuck or center drive, as viewed from the side opposite that shown in Fig. 6;

Fig. 8 is a fragmentary cross-sectional view, taken on the line 8—8 of Fig. 7, with the jaws in operative or clamped position on a workpiece, and Fig. 9 is a view similar to Fig. 8, but with the chuck jaws in inoperative or retracted position.

Referring more particularly to the drawings, the machine tool will be seen to comprise support 1, to which a bed 2 is bolted, the bed having longitudinally extending laterally spaced parallel sets of V-shaped ways 3 in its upper portion, providing parallel slideways on opposite sides of the central vertical plane containing the line 8—8, Fig. 7, for the operative elements of the machine tool.

Figure 1:
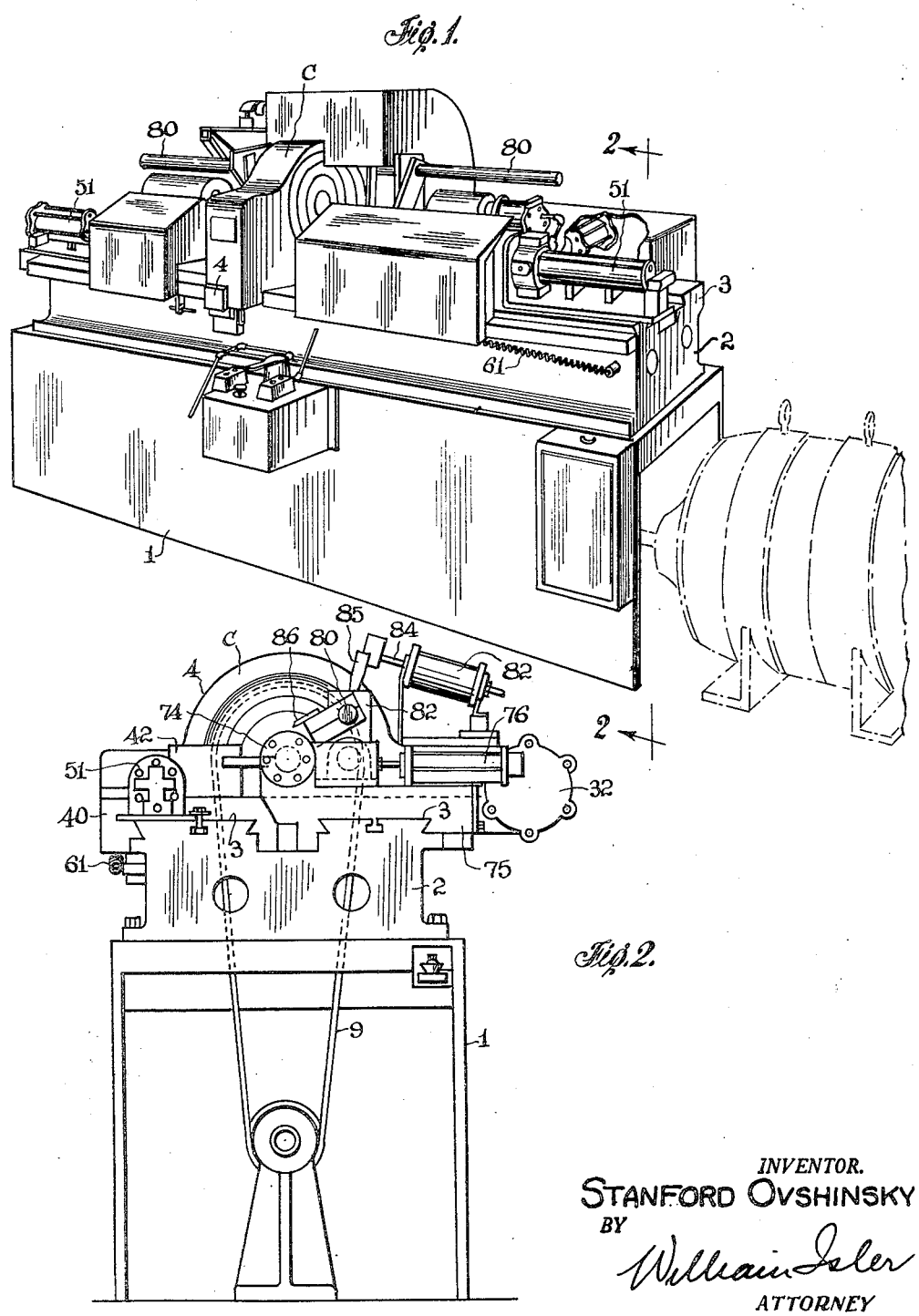
Figure 2:
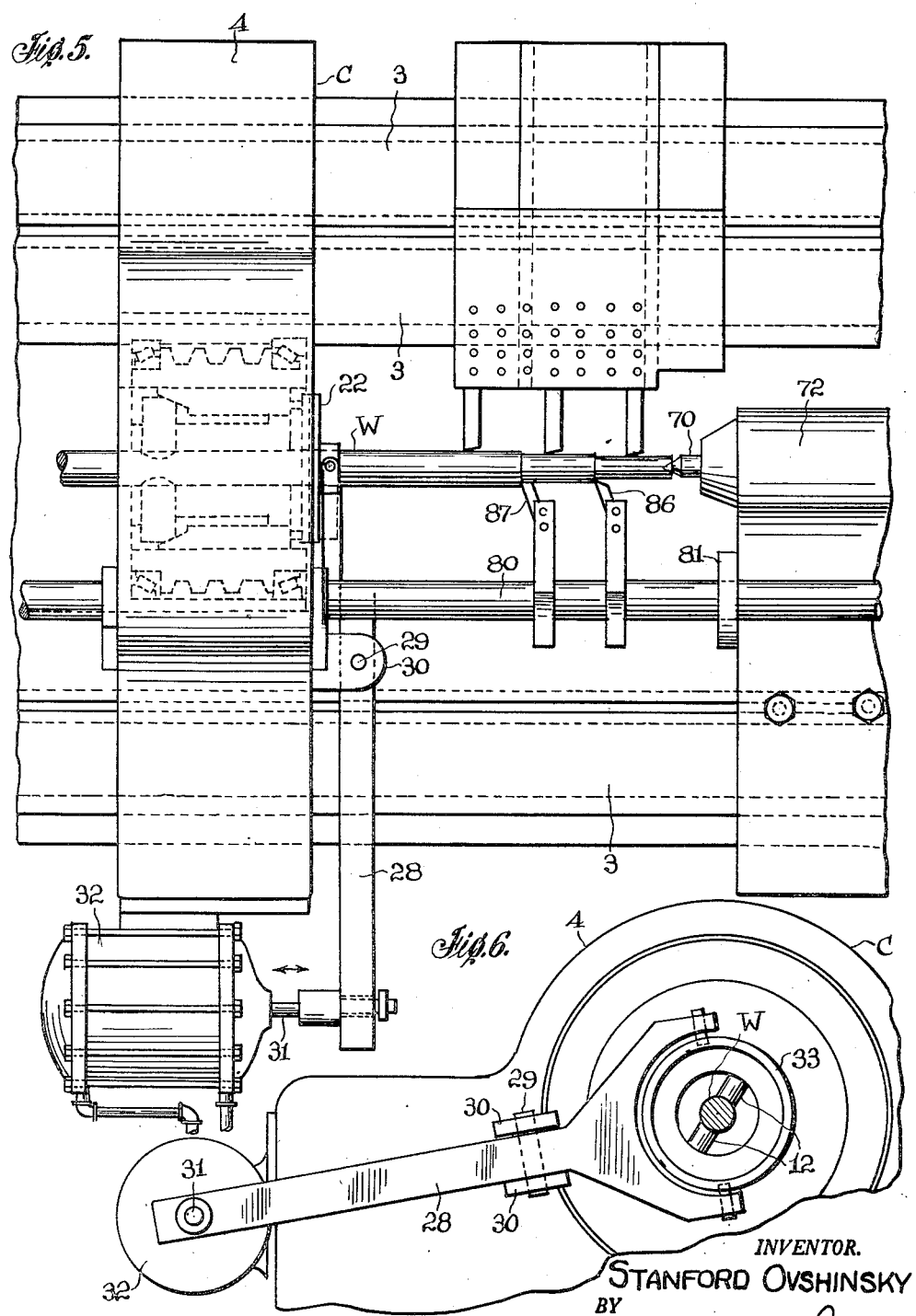
Fig. 2 is an end elevational view of the machine tool, as viewed from the right end of Fig. 1, as indicated by the arrows 2—2 of Fig. 1.

Mounted on the ways 3, centrally of the bed 2, is a chuck, which is generally designated by the letter C. The chuck C comprises a housing 4, which is secured to the ways 3 in the manner clearly shown in Fig. 7, and is provided with a bore having a horizontal axis above the ways 3 and in the vertical plane containing the line 8—8, Fig. 7. There are located in the opposite ends of the horizontal bore of the housing 4 tapered roller bearings 5 and 6, which have outer race cups pressed into the ends of the housing. An annular sleeve 7 extends through the bore of the housing 4 and the annular openings of the inner race cones of the bearings 5 and 6, the ends of the sleeve 7 being pressed into the inner race cones of the bearings 5 and 6. The annular sleeve 7 is provided in its exterior surface between the bearings 5 and 6 with annular grooves 8 in which are located V-belts 9 for driving the sleeve 7, these belts being motor-driven from a point below the chuck and within the support 1, as shown in Fig. 2.

Rigidly secured within one end of the sleeve 7 is a jaw guide 10, having radial slideways 11 for jaws 12, provided with arcuate gripping faces 13 at their radially-innermost ends, and with beveled surfaces 14 at their radially-outermost ends. Disposed within the other end of the sleeve 7 for reciprocal longitudinal movement towards and away from the jaw guide 10 is a jaw operating tubular shoe 15, which is restrained against circumferential movement relatively to the guide 10 by means of a tongue and groove connection (not shown) between the guide 10 and shoe 15.

The horizontal axes of the tapered roller bearings 5 and 6 and the annular sleeve 7 rotatably mounted thereby in the bore of the housing 4 are concentric with each other and with the horizontal axis of the bore of the housing which is the horizontal axis of rotation of the rotating parts of the chuck C. The jaws 12 are preferably symmetrical with respect to the horizontal axis of rotation, and the bevelled end 14 of each jaw 12 as shown and preferably, slopes from a high point in its radial slideway 11 in the jaw guide 10 radially towards the horizontal axis of rotation and in the direction of the axis of rotation away from the jaw guide 10 and towards the tubular shoe 15.

The shoe 15 is provided at its end adjacent the jaw guide 10 with tapered faces 16, the angle of which corresponds to the taper of the beveled ends 14 of the jaws. These faces 16 bear against the ends 14 of the jaws. The jaws 12 have leaf springs 17 extending laterally therefrom, which springs are secured to the shoe 15 by means of screws 18. These springs normally bear against jaw guide shoes 19, which are slidable relatively to the jaw operating shoe 15, and are provided with elongated slots 20 through which the screws 18 extend. The function of the springs 17 and shoes 19 will be presently explained.

As aforesaid, the tapered faces 16 are formed in the end of the shoe 15 adjacent the jaw guide 10. In the other end of the shoe 15 there is formed a counterbore having an annular bottom seat in which is seated an annular thrust plate or member 21, the annular thrust plate or member 21 being rotatable with the shoe 15 and concentric with the chuck axis of rotation. Spaced from the annular thrust plate or member 21 in the direction of the chuck axis of rotation, there is located another annular thrust plate or member 22 which is concentric with the annular thrust plate or member 21 and which is non-rotatable but movable in the direction of the chuck axis of rotation. A plurality of thrust bearing rolling members 23 are interposed between opposite faces of the annular thrust plates or members 21 and 22, the annular thrust plate or member 22 being maintained in abutment with the rolling members 23 and the rolling members 23 being thereby maintained in abutment with the annular thrust plate or member 21. The rolling members 23 as shown are rollers. Annular retainer plates 24 are secured to the opposite ends of the housing 4, and annular retainer plates 25 are secured to the opposite ends of the sleeve 7, the inner peripheral portion of each plate 24 overlapping the outer peripheral portion of each plate 25, and a lubrication seal ring 26 being located between each set of overlapping plates 24 and 25. Each plate 25 is in abutment with the outer end of the inner race cone of one of the tapered roller bearings 5 and 6, whereby adjustment of the bearings 5 and 6 may be made. Another lubrication seal ring 27 is provided between the other end of each bearing 5 and 6 and adjacent groove forming portions of the sleeve 7.

Actuation of the shoe 15 for the purpose of moving the jaws 12 to operative position, is effected by a yoke lever 28 (Figs. 5 and 6), which is mounted for pivotal movement about a pin 29 mounted in ears or lugs 30 extending from the chuck housing 4. The lever 28 is rocked about the pin 29 by means of a piston 31 of a hydraulic cylinder 32, the piston 31 and cylinder 32 constituting parts of a usual double-acting fluid pressure operated reciprocating motor. The cylinder 32 is secured at one side of the housing 4 and the ears or lugs 30 extend from the end of the chuck housing 4 adjacent to and at one side of the annular thrust plate or member 22. The yoke end of the lever 28 is pivoted to a collar 33, which is rigidly secured to the annular thrust plate or member 22. The annular thrust plate or member 22 is thus secured against rotation and is movable in the direction of the chuck axis of rotation.

The inoperative or retracted position of the jaws 12 is shown in Fig. 9. The jaws are maintained in this position by the springs 17, and by the fact that the jaw operating shoe 15 is at its extreme right position relatively to the sleeve 10.

Upon actuation of the collar 33 to the left, as indicated by the arrow in Fig. 8, which movement is effected by the yoke lever 28 and applies clamping pressure on the shoe 15, the shoe 15 is moved to its extreme left position, as shown in Fig. 8, causing the tapered surfaces 16 of the shoe to bear against the beveled surfaces 14 of the jaws, forcing the jaws 12 radially-inwardly and into clamping or gripping engagement with the workpiece W which is to be turned. This motion of the jaws 12 is perpendicular to the direction of movement of the shoe 15, and is in opposition to the tension of the springs 17, which are bowed in the manner shown in Fig. 8. The clamping pressure of the jaws 12 on the workpiece W is constant, depending upon the pressure of the fluid in the hydraulic cylinder 32.

In opening the jaws 12, the collar 33 is moved to the right, as indicated by the arrow in Fig. 9, and subjects unclamping pressure to the shoe 15 in opposition to the clamping pressure, permitting the springs 17 to retract the jaws 12, the movement of the jaws forcing the shoe 12 to the right by reason of the action of the beveled surfaces 14 of the jaws on the tapered surfaces 16 of the shoe 15.

After the workpiece W has been clamped by the jaws 12, it may be rotated for machining operations thereon, through the intermediary of the belt drive which has been described.

It is noted that the chuck jaw actuating means above described in specific terms, from a broader standpoint includes the pressure actuated non-rotating single thrust plate or member 22, which alternately applies distributed axial pressure through the rolling members 23 and plate 21 on the shoe 15 and relieves this pressure for causing and permitting alternate opposite axial movements of the shoe and alternate radial movements of the jaws towards and away from each other.

From another broader standpoint, the double-acting fluid pressure operated reciprocating motor at one side of the piston 31 is a fluid pressure operated reciprocating motor included in means for applying clamping pressure on the shoe 15. At the other side of the piston 31, the double-acting fluid pressure operated reciprocating motor is a fluid pressure operated reciprocating motor included in means for subjecting unclamping pressure to the shoe 15 in opposition to the clamping pressure.

Figure 3:
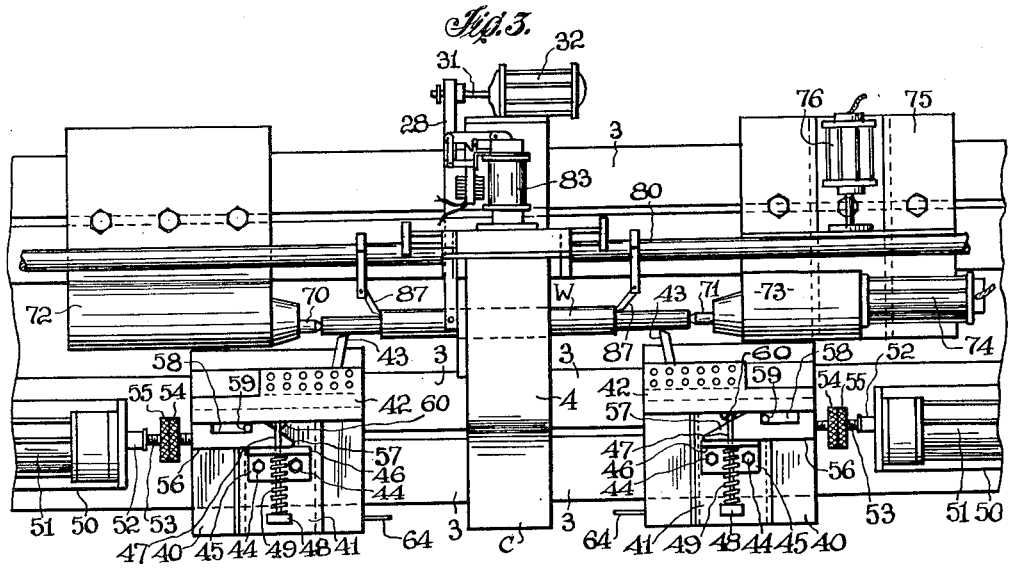
Fig. 3 is a fragmentary top plan view of the machine tool.
Figure 4:
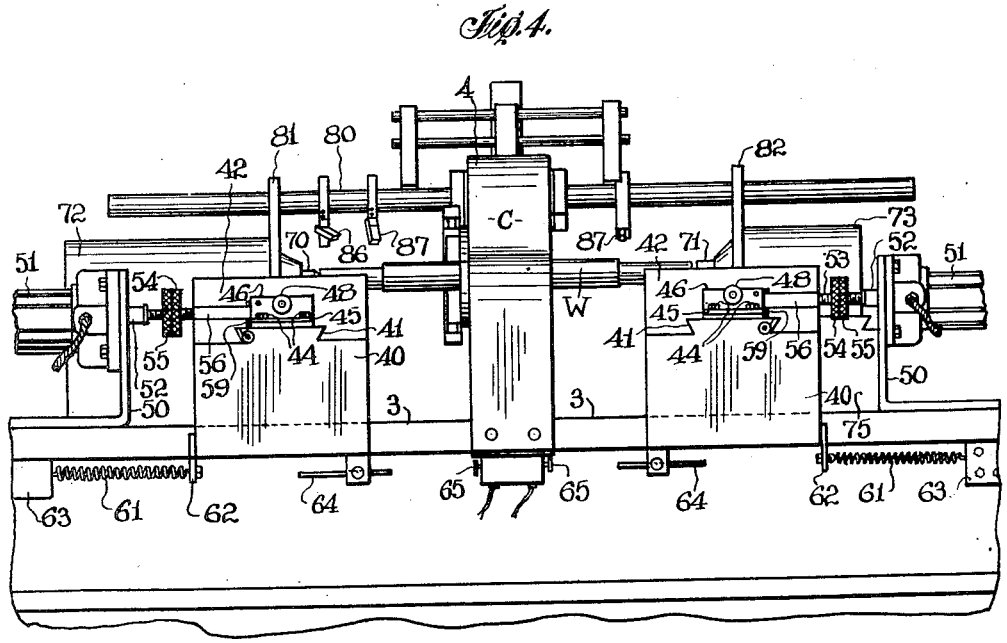
Fig. 4 is a fragmentary front elevational view of the machine tool.

Mounted for longitudinal movement along the slideways 3, at each side of the chuck, as best shown in Figs. 3 and 4, is a tool saddle 40, provided at its upper end with a V-shaped slideway 41 for a tool slide 42, which is movable transversely of the direction of movement of the saddle 40. A cutting tool or bit, secured to the tool slide 42, is indicated by reference numeral 43.

Secured, as by bolts 44, to the saddle 40, is an angle plate or bracket 45 having an upstanding flange 46, through which a rod 47 extends and is movable. The rod 47 is rigidly secured at its forward end to the tool slide 42, and is provided at its rear end with a stop collar 48. A compression coil spring 49 is mounted on the rod 47, being interposed between the rear face of the flange 46 of the bracket 44 and the stop collar 49.

Mounted on the bed of the machine adjacent each of the tool saddles 40 is a bracket 50, which supports a double-acting fluid pressure operated reciprocating motor including a hydraulic cylinder 51, and the piston 52 of which has a threaded extension 53, which carries a pair of knurled collars 54 and 55 in threaded engagement therewith. The collar 54 functions as a feed depth adjustment stop which is adapted for abutment with the tool saddle 40, and the collar 55 functions as a lock-nut for locking the collar 54 in preselected adjusted position.

Rigidly secured to the end of the extension 53 of the piston 52 is a cam bar 56 provided with a cam surface 57 and a slot 58. A pin 59 projects upwardly from the tool saddle 40 into the slot 58. The cam surface 57 is adapted for coaction with a roller 60 which is mounted at the rear of the tool slide 42. A tension coil spring 61 is interposed between and connected to a plate 62 depending from the saddle 40 and a plate 63 mounted on the bed of the machine, and serves a function to be now described.

The operation of the above-described tool feed will now be briefly described, with reference to the tool feed shown at the left side of Figs. 3 and 4.

As the piston 52 is moved to the right, as viewed in Figs. 3 and 4, the surface 57 of the cam bar 56 engages the roller 60 on the tool slide 42 and causes the tool slide to be fed inwardly towards the workpiece W, this movement continuing until the collar 54 comes into abutment with the tool saddle 40, the position of which on the extension 53 thus controls the depth of cut of the tool 43. During this movement of the tool slide, the tool saddle is prevented from moving longitudinally along the slideway 3 of the machine by reason of the tension of the spring 61 which overcomes any tendency of the cam bar 56 to cause such longitudinal movement of the tool saddle. At the same time, the coil spring 49 is compressed between the flange 46 and collar 48 as a result of the inward movement of the tool slide.

After the collar 54 abuts the tool saddle 40, the entire tool saddle is moved by the piston 52 to the right, longitudinally along the slideway 3, causing the tool 43 to take a longitudinal cut along the workpiece W. If a depth or plunge cut is not desired, means (not shown) may be provided for locking the tool slide 42 to the tool saddle 40, so as to render ineffective the action of the cam bar 56 on the roller 60.

The length of the aforesaid longitudinal cut is controlled by the engagement of an adjustable stop rod 64 on the tool saddle with a micro-switch 65 on the machine tool, which functions through a solenoid-operated valve (not shown) to reverse the direction of movement of the piston 52. This reversal of the direction of movement of the piston 52 causes the tool slide to be retracted from the workpiece W instantaneously, as a result of the tendency of the spring 49 to assume its original uncompressed condition, the surface 57 of the cam bar having already been instantaneously retracted to permit this retraction of the tool slide. Then, after the right end of the slot 58 in the cam bar comes into engagement with the pin 59, the tool saddle is moved back to its original position by the continued movement of the piston 52 to the left.

The hydraulic pressure within the cylinder 51, acting constantly on the tool slide 42 through the cam bar 56, is such that the tool slide cannot move rearwardly away from the workpiece during either the depth or longitudinal cut, because the force acting on the tool slide is always greater than the force produced by the cutting action of the tool. As a result, there is no tendency or possibility of the tool gouging the workpiece, as in conventional machining practice, especially where a shaft is machined to form a shoulder. This anti-gouging action is a unique feature of the machine tool.

Referring again to Figs. 3 and 4 of the drawings, it will be seen that the workpiece W has its ends mounted on live centers 70 and 71. The center 70 is mounted on a head stock 72, the position of which, longitudinally of the machine, may be adjusted, but which remains stationary after adjustment. The center 71 is mounted on a tail stock 73, constant pressure on the centers 70 and 71 and consequently on the workpiece, by a double-acting fluid pressure operated reciprocating motor including a piston disposed within a hydraulic cylinder 74, which piston exerts pressure on the center 71. The tail stock 73 is mounted in such a manner that it can be moved transversely of the bed 3, along a support 75, by means of a double-acting fluid pressure operated reciprocating motor including a piston in a hydraulic cylinder 76, for purposes of loading and unloading workpieces in the machine.

The transversely movable tail stock 73 is included in the subject matter and claims of my co-pending application for U. S. Letters Patent for Machine Tool, Serial No. 750,391, filed May 26, 1947, now Patent No. 2,619,709.

The support 75 is also movable longitudinally of the slideway 3 for the purpose of adjusting the position thereof longitudinally of the machine.

The machine tool further includes an overhead bar 80, mounted in bearings 81 and 82, and adapted to be rocked in these bearings between an operative and inoperative position. This bar is rocked between said positions by a double-acting fluid pressure operated reciprocating motor including a hydraulic cylinder 83, through piston 84 of the motor, and levers 85. The bar has clamped thereto at preselected points various tools for chafering and undercutting, which are represented more or less diagrammatically by reference numerals 86 and 87 respectively. These tools may be rocked or moved into operative position by the cylinder 83, after the tool slides 42 have been retracted at the conclusion of the turning operations. The use of such an overhead bar and tools is highly advantageous in that it obviates the need for removing or replacing the tools from the slides 42 for operations such as chamfering, undercutting, etc., and thereby increases the speed of all machining operations in production work.

The machine tool, as thus described, is characterized by the following advantages, among others:

(a) The V-shaped slideways on the bed of the machine enable the tool slides to be used at the rear of the machine as well as the front, and is superior in construction to conventional slideways of inverted V-shape.

(b) The massiveness, rigidity and general construction of the machine are such that the machine can easily absorb stresses imposed upon it by the full power transmitted by the chuck. This is particularly noticeable in machining with carbide tools.

(c) The construction of the chuck is such that it makes the center drive not only a self-centering and a work clamping unit, but also a driving unit as well, and also, sets up a dampening effect, so that no vibrations are transmitted from one end of the chuck to the other. This creates a freedom from chatter, which enables machining operations on a workpiece at one side of the chuck to be accomplished without affecting machining operations on the same workpiece at the other side of the chuck.

(d) By supporting the workpiece at three points, i. e., by the centers and the chuck, there is a complete absence of the "leverage" which is typical of single end machines and which causes deep feed marks during machining operations, due to the wiggle of the workpiece.

(e) The chuck is not driven through a chain of gears (which results in loss of horsepower), but is driven directly by the motor. This increases the mechanical efficiency of the machine.

(f) The air or hydraulic pressure applied from the yoke arm 28 to the sleeve 15 through the thrust bearing 23 allows for no backlash. Since this pressure is regulated, the force is constant and independent of the motive power, and the chucking operation is completely automatic.

(g) No slippage of the workpiece in the chuck can occur. This enables deep cuts to be taken in a workpiece, at high speeds and feeds which were heretofore considered unattainable.

(h) The narrow center drive permits a shaft to be machined to a point near the chuck jaws, there being less than 1½ inch of inaccessible or dead space within the chuck. This is extremely important, in that it permits the machine to be used for many types and varieties of jobs that were heretofore considered impossible.

It will be understood that the machine tool may be modified in many respects without departing from the scope of the invention. For example, while employing tool saddles and slides as shown, turret attachments may be provided at each end of the machine, so that a multiplicity of operations may be performed by the turret tools on each end of the workpiece, independently of the other. Moreover, other types and varieties of chuck jaws may be employed than those shown. The machine, in general, is adapted not only for the machining of shafts, as described, but also for the machining of forgings, ferrous and non-ferrous castings, facing, centering, metal spinning, threading, boring, and various other operations.

Having thus described my invention, I claim:

1. In a machine tool of the character described, means for rotating a workpiece, said means comprising a chuck having jaws movable inwardly and outwardly radially thereof, and means for thus moving said jaws, said last-named means comprising a tubular shoe movable axially of the chuck and having cam surfaces each acting directly on one of said jaws to cause said radial inward movement, means for applying distributed clamping pressure on the shoe and moving the shoe in the direction for moving the jaws radially inwardly, means for subjecting unclamping pressure to the shoe in opposition to the clamping pressure, and means connecting each jaw with the shoe for moving the jaw radially outwardly when unclamping pressure is subjected to the shoe.

2. In a machine tool of the character described, a chuck for rotating a workpiece, said chuck comprising a stationary housing, an annular sleeve mounted for rotation in said housing, means for directly rotating said sleeve, a jaw guide mounted in said sleeve and driven by the sleeve, jaws movable radially of said guide, a jaw actuating shoe mounted for movement in opposite directions in said sleeve and having a driving connection therewith, the shoe having cam surfaces each acting directly on one of said jaws to cause radially-inward movement thereof during movement of said shoe in one clamping direction, and each jaw having a connection with said shoe causing radially-outward movement of the jaw during movement of said shoe in the opposite unclamping direction, means for applying clamping pressure on the shoe in the clamping direction, and means for subjecting unclamping pressure to the shoe in opposition to the clamping pressure.

3. A machine tool, as defined in claim 2, in which the connection of each jaw with said shoe includes a flat spring.

4. A machine tool as defined in claim 2, and in which the clamping pressure applying means includes a fluid pressure operated reciprocating motor.

5. A machine tool, as defined in claim 2, and in which the unclamping pressure subjecting means includes a fluid pressure operated reciprocating motor.

6. A machine tool, as defined in claim 2, and in which the clamping pressure applying means includes one side of a double acting fluid pressure acting reciprocating motor and the unclamping pressure subjecting means includes the other side of the double acting fluid pressure operated reciprocating motor.

7. In a machine tool of the character described, means for rotating a workpiece, said means comprising a chuck having jaws movable radially inwardly and outwardly thereof, and means for moving said jaws, said last-named means comprising a tubular shoe movable axially of the chuck and having cam surfaces each acting directly on one of said jaws to cause said radial inward movement, the shoe having an outer end spaced from said jaws, a single non-rotating reciprocating member adjacent said sleeve outer end, roller bearing means interposed between the single non-rotating member and the shoe outer end, means for applying clamping pressure on the non-rotating member for moving the shoe in the direction for moving the jaws radially inwardly, and means for subjecting unclamping pressure to the non-rotating member in opposition to the clamping pressure.

8. In a chuck for a machine tool and the like, a stationary housing having an opening extending therethrough, an annular sleeve located in the housing opening, the annular sleeve having a longitudinal axis, means mounting the sleeve in the housing opening for rotation of the sleeve about its longitudinal axis, a jaw guide within the sleeve and secured thereto for rotation therewith, the jaw guide having formed therein slideways extending radially of the axis of rotation, a jaw slidably fitting in each slideway, each jaw having a workpiece gripping face at its radially-innermost end and a surface at its radially-outermost end, a jaw actuating tubular shoe fitting in the sleeve at one side of the jaw guide and jaws, means mounting the shoe for movement towards and away from the jaw guide and jaws in the direction of the axis of rotation, the shoe having formed therein cam surfaces each abutting directly on the surface of the radially-outermost end of one of the jaws to cause radially-inward movement thereof during an axial movement of the shoe, a first annular thrust member seated in the shoe and being rotatable therewith and concentric with the axis of rotation, a second annular thrust member spaced from the first annular thrust member in the direction of the axis of rotation and the second annular thrust member being concentric with the axis of rotation, rolling members interposed between opposite faces of the annular thrust members, and mounting and actuating means extending between and being operatively connected with the housing and the second annular thrust member, the mounting and actuating means for the second annular thrust member securing the second annular thrust member against rotation and being operative for moving the second annular thrust member and the rolling members and the first annular thrust member and the shoe in the direction of the axis of rotation so as to cause radially-inward movement of the jaws.

9. In a chuck for a machine tool and the like as set forth in claim 8, and in which the mounting and actuating means for the second annular thrust member includes a lever, means pivotally mounting the lever intermediate its ends on the housing at one side of the housing opening, the lever including a first arm extending from the pivotal mounting of the lever on the housing crosswise of the second annular thrust member, and means pivotally connecting the first lever arm with the second annular thrust member.

10. In a chuck for a machine tool and the like as set forth in claim 9, and in which the lever includes a second arm extending from the pivotal mounting of the lever in another direction than that of the first arm, a fluid pressure-operated reciprocating motor mounted on the housing, the fluid pressure-operated reciprocating motor including a reciprocating piston and means operatively connecting the piston with the second lever arm.

11. Apparatus for actuating radially movable clamping members in a rotary chuck and the like, the actuating apparatus including a driven rotary member rotatable about an axis and adapted for mounting radially movable clamping members, an actuating member adapted for operative connection with the radially movable members, means mounting the actuating member for axial movement in opposite directions on the driven rotary member, one direction being a clamping direction and the other direction being an unclamping direction, means for applying clamping pressure on the actuating member in the clamping direction, and means for subjecting unclamping pressure to the actuating member in opposition to the clamping pressure, and a non-rotating reciprocating pressure transfer member adjacent the actuating member, and roller thrust bearing means interposed between the rotary actuating member and the pressure transfer member, and the pressure transfer member being included in the means for applying clamping pressure on the actuating member and being also included in the means for subjecting unclamping pressure to the actuating member in opposition to the clamping pressure.

12. Apparatus for actuating radially movable clamping members in a rotary chuck and the like, as defined in claim 11, and in which spring means interposed between the driven rotary member and the actuating member urge the actuating member towards the pressure transfer member.

References Cited in the file of this patent
UNITED STATES PATENTS

| Number | Name | Date |
|---|---|---|
| 815,877 | Taylor | Mar. 20, 1906 |
| 1,219,083 | Church | Mar. 13, 1917 |
| 1,493,212 | Mansfield | May 6, 1924 |
| 1,816,655 | Ragan | July 28, 1931 |
| 1,939,147 | Snyder | Dec. 12, 1933 |
| 2,048,107 | Collins | July 21, 1936 |
| 2,067,107 | Tomkins | Jan. 5, 1937 |
| 2,093,757 | Godfriaux | Sept. 21, 1937 |
| 2,122,360 | Sloan | June 28, 1938 |
| 2,360,001 | Le Tourneau | Oct. 10, 1944 |
| 2,462,155 | Benjamin | Feb. 22, 1949 |
| 2,529,205 | Weimer | Nov. 7, 1950 |
| 2,565,330 | Sundt | Aug. 21, 1951 |
| 2,619,710 | Ovshinsky | Dec. 2, 1952 |